United States Patent [19]

Dörffel et al.

[11] 4,204,014
[45] May 20, 1980

[54] LIQUID COATING COMPOSITIONS CONTAINING LITTLE OR NO SOLVENT

[75] Inventors: Jörg Dörffel, Marl; Werner Andrejewski, Dorsten; Wilfried Bartz, Marl, all of Fed. Rep. of Germany

[73] Assignee: Chemische Werke Huels, AG, Marl, Fed. Rep. of Germany

[21] Appl. No.: 36,708

[22] Filed: May 7, 1979

Related U.S. Application Data

[63] Continuation-in-part of Ser. No. 895,673, Apr. 12, 1978, abandoned.

[30] Foreign Application Priority Data

May 14, 1977 [DE] Fed. Rep. of Germany ....... 2721989

[51] Int. Cl.$^2$ ........................ B05D 3/02; C08L 61/20; C08L 67/00
[52] U.S. Cl. ............................... 427/385.5; 260/39 R; 260/40 R; 525/443; 528/302; 427/388.3
[58] Field of Search ........... 427/385 A, 388 B, 385 R; 260/850, 39 R, 40 R; 525/443; 528/302

[56] References Cited

U.S. PATENT DOCUMENTS 3,819,757  6/1974  Dorffel et al. ........................ 260/850

Primary Examiner—Michael R. Lusignan

Attorney, Agent, or Firm—Millen & White

[57] ABSTRACT

In a liquid coating composition comprising a small amount of solvent or no solvent, a binder and optionally conventional auxiliary agents, wherein the binder consists essentially of:

(A) 45-10% by weight of an aminoplast, the low molecular weight precursors thereof, or mixtures thereof; and (B) 55-90% by weight of an at least difunctional polyester or a mixture of such polyesters; wherein the polyester component B has been produced by the condensation of a conventional alcohol component I with an acid component III, wherein component III consists essentially of a mixture of:

III.1 67-92 molar percent of hexahydroterephthalic acid or a lower alkyl ester thereof; and III.2 8-33 molar percent of an aromatic dicarboxylic acid or a lower alkyl ester derivative thereof;

wherein the polyester component B has a molecular weight of 300-1,500 and wherein the binder may be obtained by the cocondensation of aminoplast component A with polyester component B, or by the cocondensation of the starting materials used for the production of aminoplast component A with polyester component B;

the improvement wherein component III.2 is terephthalic acid or a lower alkyl ester derivative thereof.

15 Claims, No Drawings

LIQUID COATING COMPOSITIONS CONTAINING LITTLE OR NO SOLVENT

CROSS-REFERENCE TO RELATED APPLICATIONS

This application is a continuation-in-part of a copending U.S. Ser. No. 895,673, filed Apr. 12, 1978, abandoned.

BACKGROUND OF THE INVENTION

The present invention relates to liquid coating compositions which have a low solvent content or are solvent-free. They optionally contain conventional auxiliary agents and comprise a mixture of aminoplasts and polyesters.

Such ecologically acceptable coating compositions have been known for several years (U.S. Pat. No. 3,852,375; DAS 2,019,282). Also conventional are coating compositions which contain polyesters, the acid component of which is formed entirely or partially from hexahydroterephthalic acid units (German Pat. Nos. 1,644,766 corresponding to U.S. Pat. No. 3,553,284; 2,343,436 corresponding to British Pat. No. 1,471,779; 2,457,775 corresponding to U.S. application Ser. No. 686,483 filed May 14, 1976, now allowed; and DOS 2,437,217. German Pat. No. 1,644,766 expressly refrains from claiming low-solvent or solvent-free coating compositions. German Pat. No. 2,343,436 is limited with respect to the acids to be used in addition to hexadydroterephthalic acid, to aromatic dicarboxylic acids having carboxy groups in the 1,2- and/or 1,3-positions. German Pat. No. 2,457,775 also mentions only these isomers (see column 5, line 20).

As thorough investigations have shown, the coating compositions of the prior art possess a decisive disadvantage. In order to obtain coatings satisfying stringent requirements under practical testing conditions, baking temperatures of greater than 130° C., in most cases even greater than 150° C., (DOS 2,437,217, Example 3) heretofore had to be employed. To save energy costs, it is desirable to lower the baking temperatures, of course, while maintaining the satisfactory final properties. In processing the products of the prior art, baking temperatures of less than 150° C. or less than 130° C. can be utilized, but in such cases, it is necessary to substantially prolong the baking times so that the curing process loses its economic advantage and, moreover, no longer meets practical requirements. Furthermore, larger amounts of catalysts do not aid in achieving the desired result, since they impair the properties of the final coatings, such as, for example, the gloss.

DOS 2,437,217 describes coating compositions which, in accordance with the examples, can be baked at 120° C. within a period of time satisfying practical requirements and produce satisfactory coatings. Experiments by the inventors, however, have shown that the coating compositions described therein, in contrast to the other products of the aforementioned prior art references, cannot be baked, for example, at 170°–180° C. (which is a temperature range customary for use in certain manufacturing processes), without the occurrence of defects in the coating. Due to such deficiencies produced by exposure to higher temperatures, the binders of DOS 2,437,217 are extremely sensitive to the increased thermal loads which occur, for example, when a conveyor belt comes to a standstill during series-enameling operations. Furthermore, these coating compositions do not exhibit sufficient stability during the baking step, as do, for example, the coating compositions of German Pat. No. 2,457,775.

Other relevant liquid coating compositions are disclosed in U.S. Pat. Nos. 3,553,284, 3,668,275, 3,668,276, 3,668,277, 3,678,128, 3,691,258 and 3,819,757, the latter of which discloses the use of a 1,4 dicarboxylic aromatic acid (terephthalic) as an acid component in a system significantly different from that of this invention.

SUMMARY OF THE INVENTION

Accordingly, it is an object of this invention to provide a coating composition which can be baked even at baking temperatures of less than 130° C. and still exhibit the good properties which are conventional for the general class of coating compositions as described above.

Upon further study of the specification and appended claims, further objects and advantages of this invention will become apparent to those skilled in the art.

These objects of the present invention have been attained by providing an improved liquid coating composition comprising a small amount of solvent or no solvent, a binder and optionally conventional auxiliary agents, wherein the binder consists essentially of:

(A) 45–10% by weight of an aminoplast, the low molecular weight precursors thereof; or mixtures thereof; and (B) 55–90% by weight of an at least difunctional polyester or a mixture of such polyesters; wherein the polyester component B has been produced by the condensation of an alcohol component I with an acid component III, wherein component I consists essentially of:

I.1 0–50 molar percent of one or more aliphatic polyols of 3 or 4 hydroxy groups and 3–6 carbon atoms; and I.2 100–50 molar percent of a mixture II of aliphatic and cycloaliphatic diols wherein mixture II consists essentially of:

II.1 0–90 molar percent of ethylene glycol;

II.2 0–90 molar percent of 1,2-propanediol; and

II.3 0–40 molar percent of one or more aliphatic or cycloaliphatic diols whose hydroxy functions are separated by 2–8 carbon atoms and up to 2 carbon atoms of which can be replaced by oxygen atoms which are separated from each other and from the hydroxy groups by at least 2 carbon atoms;

wherein component III consists essentially of a mixture of:

III.1. 67–92 molar percent of hexahydroterephthalic acid or a lower alkyl ester thereof; and III.2. 8–33 molar percent of an aromatic dicarboxylic acid or a lower alkyl ester derivative thereof;

wherein the polyester component B has a molecular weight of 300–1,500 and wherein the binder may be obtained by the cocondensation of aminoplast component A with polyester component B, or by the cocondensation of the starting materials used for the production of aminoplast component A with polyester component B;

the improvement wherein component III.2 is terephthalic acid or a lower alkyl ester derivative thereof.

DETAILED DISCUSSION

Suitable polyols for use as component I.1 include for example, glycerol, trimethylolethane, trimethylolpropane, and pentaerythritol. Glycerol and trimethylolpropane are preferred. Component I.1 is preferably contained in the polyesters of (B), in amounts of 0–20 molar percent typically 0 or 0,1–50 molar percent; correspondingly, the polyesters preferably contain component I.2 in amounts of 80–100 molar percent.

Suitable diols for use as component II.3 include, for example, 1,3-propanediol, 1,2-butanediol, 2,3-butanediol, 1,3-butanediol, 1,4-butanediol, 2,2-dimethyl-1,3-propanediol, 1,6-hexanediol, 1,4-bis(hydroxymethyl)cyclohexane; x,8-bis(hydroxymethyl)tricyclo-[5,2,1,0$^{2,6}$]decane, wherein x is 3, 4 or 5; diethylene glycol and dipropylene glycol. Cycloaliphatic diols can be used in their cis-form, trans-form or as a mixture of both forms. In one embodiment of the invention, component II.3 is preferably used in amounts of 0–30 molar percent, typically 0 or 0.1–40 molar percent. Components II.1 and II.2 are preferably used in amounts of 20–80 molar percent and 80–20 molar percent, respectively.

In another embodiment of this invention, component II.2 is preferably used in amounts of 0–90 molar percent, typically 0 molar percent. In this embodiment, components II.1 and II.3 are preferably used in amounts of 60–90 molar percent and 10–40 molar percent, respectively.

In yet another embodiment of this invention, component II.1 is preferably used in amounts of 0–90 molar percent, typically 0. In this embodiment, components II.2 and II.3 are preferably used in amounts of 60–90 molar percent and 10–40 molar percent, respectively.

The hexahydroterephthalic acid (III.1) is preferably contained in the acid component III in amounts of 75–88 molar percent. Correspondingly, component III.2 is contained in amounts of 12–25 molar percent. Both acids III.1 and III.2 can be used for the manufacture of the polyester in their free acid form. However, it is preferred that the lower alkyl esters of these acids are used in the reaction. Lower alkyl groups are those having from 1–4 carbon atoms. Mono- or diesters can be used. The dimethyl esters are especially preferred. In this regard, a cis, trans-isomer is preferred for use as the dimethyl hexahydroterephthalate since it is obtained in a high-pressure hydrogenation of dimethyl terephthalate.

The number of moles of alcohol component I relative to that of acid component III should be chosen so that the polyester product has end groups which are predominantly free hydroxy groups, with, of course, optionally some free carboxy end groups.

Preferably, the polyesters used in accordance with this invention have a molecular weight of 600–1,000. The molecular weight is understood to be the number average molecular weight determined by end group titration.

The use of polyols of more than 2 hydroxy groups increases the viscosity of the polyesters of this invention. The viscosity can also be controlled by adjustment of the amount of diols (II.3) which are optionally included. The utilization of longer-chain, linear diols lowers the viscosity, whereas use of branched or cycloaliphatic diols produce a rise in viscosity.

The ratio of components III.1:III.2 is critical for the polyesters to be used in this invention. If the contents of terephthalic acid or the lower alkyl esters thereof are lower than prescribed by this invention, only inadequately hard coatings are obtained at baking temperatures of, for example, 120° C. Conversely, terephthalic acid contents which are too high lead to crystalline products which cannot be dissolved in the conventional varnish solvents.

The polyesters can be produced in accordance with all conventional and customary methods, with or without a catalyst, with or without passing an inert gas stream through the reaction mixture, by solvent condensation, melt condensation, or azeotropic esterification at temperatures of up to 250° C., optionally also at higher temperatures, the thus-liberated water or, for example, methanol, being removed. The esterification can be controlled by determination of hydroxy number and, if the free dicarboxylic acids are employed, additionally by determination of acid number. Normally, the esterification conditions are chosen so that the reaction is as complete as possible. The molecular weight of the esters can thus be regulated by control of the feed ratio of the alcohol component (diol and optionally polyol) and dicarboxylic acid or ester thereof.

If a portion of the acid component is utilized in the form of the free acid and another portion as the alkyl ester, it is more advantageous to conduct the reaction in two successive stages. In this procedure, in the first stage, the alkyl ester is interesterified with part of or with the entire amount of the diols and/or polyols necessary for the production of the esters, until the alcohol moiety is almost entirely eliminated. Thereafter, the residual components are added and the condensation is carried out, while water is being split off, until the desired degree of conversion has been attained.

The esterification conditions are fully conventional and are disclosed for example in U.S. Pat. No. 3,553,284 whose disclosed is incorporated by reference herein.

When using the more highly reactive amonoplasts which cure without the addition of strongly acidic catalysts, it is advantageous to employ polyesters having acid numbers of up to 30 mg KOH/g, preferably up to 20 mg KOH/g. Such products are obtainable when using the free dicarboxylic acids, for example by interrupting the reaction at the desired acid number. For polyesters obtained by interesterification, which practical have no free carboxyl end groups, or for polyesters produced by esterification with an acid number of less than 5 mg KOH/g, the acid number can subsequently be raised greatly by reaction at 130°–190° C., with relatively strongly acidic polycarboxylic acids and/or the anhydrides thereof, such as, for example, maleic acid, phthalic acid, trimellitic acid, pyromellitic acid, wherein the last two acids are preferred. The acid numbers of such polyesters are preferably increased to values in the range of >5–20 mg KOH/g.

The esterification or transesterification temperature is selected so that the losses in the readily volatile substances which are the reactant components of the esters of this invention remain small, i.e., at least during the first esterification interval, the reaction is carried out at a temperature lying below the boiling point of the lowest-boiling starting compound.

The properties of the coatings produced from the polyesters used according to this invention are dependent on the average molecular weight, the functionality and the composition of the polyesters. At higher average molecular weights, the hardness of the varnish film is normally diminished while the elasticity increases. Conversely, at lower molecular weights the flexibility of the varnish film is reduced with a simultaneous increase in hardness.

The differences in the compositions of the polyesters have a similar effect. With increasing content of hexahydroterephthalic acid units in the polyester chain, the elasticity of the varnish film rises whereas its hardness decreases. With increasing chain length of the open-chain diols (II.3) to be auxiliarily employed in low amounts, and with increasing proportion of these diols in the polyester, the varnish film becomes softer and more flexible. However, if diols having short and branched carbon chains or cycloaliphatic rings are additionally used in the production of polyesters, then the coatings obtained normally yield harder and less elastic films with increasing proportion of these diols.

Also the molar ratio of polyol to diol is of significance for the mechanical characteristics of the varnish films. As the molar ratio of polyol to diol decreases, the hardness of the films likewise decreases, while their elasticity increases. Conversely, with higher molar ratios of polyol to diol, the flexibility of the varnish films is reduced and the hardness is improved.

In accordance with these relationships, a person skilled in the art is readily capable of selecting polyesters within the scope of the disclosed range having optimum properties for any particular application using fully conventional considerations.

The aminoplast component A is fully conventional and is described fully in the prior art, e.g., U.S. Pat. Nos. 3,668,275, 3,668,276, 3,668,277, 3,678,128, 3,691,258, 3,770,668 and the references cited therein whose disclosures are incorporated by reference.

Suitable such aminoplasts include the conventional reaction products of aldehydes, especially formaldehyde, with compounds carrying several amino or amido groups, such as, for example, with melamine, urea, dicyandiamide, and benzoquanamine. Also suitable are mixtures of such products. Especially suitable are the aminoplasts modified with alcohols.

Due to their low viscosity, the low-molecular weight, structurally well-defined aminoplasts, which are practically totally miscible with the polyesters used in this invention, are preferably employed. Such structurally defined aminoplasts include, for example, dimethylolurea, tetramethylolbenzoguanamine, trimethylolmelamine and hexamethylolmelamine. The latter can also be used in a partially or entirely etherified form, such as, for example, dimethoxymethylurea; tetrakis (methoxymethyl)benzoguanamine; tetrakis(ethoxymethyl)benzoguanamine; partial or complete etherification products of hexametylolmelamine, such as tetrakis(methoxymethyl)bismethylolmelamine, pentakis(methoxymethyl)monomethylolmelamine and hexakis(methoxymethyl)melamine, as well as mixtures of these three compounds; or hexakis(butoxymethyl)melamine. Especially preferred are hexamethylolmelamine derivatives which are liquid at room temperature and are etherified with alcohols of 1–4 carbon atoms.

When using these aminoplasts, the addition of strongly acidic catalysts, e.g., p-toluenesulfonic acid, is preferred to accelerate the curing process. To obtain varnishes having a longer shelf life, the use of blocked catalysts is especially preferred.

In a preferred embodiment, more highly reactive, relatively low-viscosity, higher-molecular weight melamine resins are used which have been developed specifically for low-solvent enamels. These resins cure into hard-elastic films in conjunction with the polyesters having a small amount of carboxy end groups, without the addition of a catalyst. These melamine resins, which are in most cases partially etherified with methanol but still have a considerable number of non-etherified methylol groups, are conventional and have been described, for example, by L. A. Rutter ("Adhaesion" [Adhesion] 1974 [vol. 6] : 178; see amino resins of Group II).

Of course, the polyesters for use in this invention can also be combined with higher-molecular weight aminoplasts. Usually, the polyesters of this invention are miscible with such aminoplast resins in the disclosed mixing ratios without formation of turbidity. However, if the mixtures of the resinous aminoplasts and the polyesters of this invention produce cloudiness, their compatibility can be improved by conventionally reacting the polyesters with the aminoplasts in bulk or in solution, wherein care must be taken that the reaction does not progress to crosslinking. (See, for example, U.S. Pat. No. 3,852,375). This can be accomplished, for example, by heating to 50°–120°C. the mixture or solution of the two resins for a short time, optionally in the presence of a catalyst, such as, for instance, organic or mineral acids.

It is also possible to add the polyesters used in this invention to the aminoplast preparation medium prior to or during the preparation of the aminoplast resins from, for example, urea, benzoguanamine, or melamine, and aldehydes. In this connection, it is, of course, also possible to additionally employ the conventional alkanols used for modifying the thus-formed aminoplast resin. The methods for the preparation of such amine-/aldehyde resins are known. (See, for example, U.S. Pat. No. 3,678,128). As can be seen, for combination with the polyesters to be used in this invention, a plurality of commercially available aminoplasts can be utilized such as those disclosed above or referred to in prior art publications.

To produce the coating compositions of this invention, the ester and the aminoplast or the aminoplast solution are normally mixed together first. The weight ratio of polyester to aminoplast can vary between 55:45 and 90:10, preferably between 65:35 and 85:15. The optimum ratio of the two components for any particular application of the varnishes can be readily determined by routine preliminary tests. In this connection, frequently, the hardness of the coatings is increased and the elasticity reduced by an increase in the aminoplast proportion, whereas with a reduction in the aminoplast proportion the hardness is impaired and the flexibility improved.

In correspondence with the desired purpose for which the coating composition is to be employed, the viscosity thereof can be lowered by adding small amounts of conventional polar solvents, such as, for example, propanol, isopropanol, butanol, ethyl acetate, butyl acetate, ethyl glycol, ethyl glycol acetate, butyl glycol, methyl ethyl ketone methyl isobutyl ketone, cyclohexanone, 2-nitropropane trichloroethylene or mixtures of various solvents of this type. It is also possible, and in certain cases advisable for economic reasons, to additionally employ relatively large amounts of less polar solvents, such as, for example, xylene, higher-boiling aromatic cuts, or aliphatic hydrocarbon mixtures e.g., mineral spirits. The proportionate amount of these less polar solvents which is added to the composition can be arbitrarily selected within the scope of the solubility of the polyesters and the compatibility thereof with the aminoplasts employed. According to this invention, the coating compositions contain in no case more than 30% by weight of solvent. Typically, the amount of solvent is less than 25 wt. %, preferably less than 20 wt. %. Generally, from 1–30 wt. % of total solvent is used or none at all. Typical amounts of conventional polar solvents are 10–100wt. %, preferably 30–80 wt. %, and of less polar solvents are less than 90wt. %, preferably 70–20 wt. %, based on total solvent content.

The coating compositions of this invention can contain, in addition to rather large quantities of pigment, the conventional additives and auxiliary agents, especially flow agents and furthermore other binders, such as, for example, epoxy resins and silicone resins, the latter of which contain hydroxy groups.

The binder/pigment ratio is determined by the particular end use of the coating. Thus, if the binders are intended for the preparation of enamel top coats for automobiles or industrial varnishes they are pigmented in a binder/pigment weight ration of 1:0.3 to 1:1. Even with a binder/pigment ratio of 1:1.1 to 1:1.3, as is customary in the coating of packaging material or in coil coating, the coatings of this invention show unusually good properties. The coating compositions of this invention can also have still higher pigment contents, e.g., a binder/pigment ratio of 1:2 to 1:3, as are customary, for example, in the preparation of primer coats.

The thus-obtained coating compositions are applied by conventional methods, for example by spreading, spraying, dipping, rolling, et. —in the cold, warm, or hot state. They are baked at temperatures of 100°–180°C., preferably 110°–200° C. and especially 120°–180° C. For baking temperatures of 100°–130° C., especially 100°–120° C., significant savings in energy costs are derived. When utilizing almost completely etherified hexamethylolmelamine derivatives, an acidic catalyst is preferably added, e.g., p-toluenesulfonic acid, to accelerate crosslinking. Since when using such strongly acidic catalysts the coating compositions may display a viscosity increase even at room temperature, it is advantageous to employ conventional blocked catalysts which deploy their catalytic activity only at higher temperatures. For reasons of improved shelf life and better electrostatic processability, the use of blocked acids is preferred, such acids being described e.g., in DAS 2,345,114 or in German Pat. No. 2,356,768. If the more highly reactive aminoplasts are employed, the curing step is preferably conducted without addition of a catalyst.

The coatings prepared according to this invention have a multitude of good properties. They display a high gloss, can be well pigmented and show high adhesion, especially to metals. In salt spray tests, tropical tests, and tests in the Weather-O-Meter, they exhibit excellent weatherability and protection against corrosion. Furthermore, they have high shelf stabilities especially when nonionically blocked catalysts or the more highly reactive melamine resins without catalysts are used. In addition, they are distinguished by excellent antisag properties on vertical surfaces during the baking step.

An outstanding property of the coating compositions of this invention is that they enable the production of hard-elastic coatings even if the baking temperature is varied over a wide range. The heretofore conventional polyester/aminoplast binders which can be applied without a solvent or with a low amount of solvent produce hard-elastic coatings which are also stable during enameling, only if they have been baked at temperatures of greater than 130° C. or often greater than 150° C. Although it is also possible to use lower baking temperatures with some prior art products, an undesirable prolongation of the baking time to a length which does not satisfy practical requirements results. Alternatively, if the amount of catalyst is increased, the amounts required are so large that the quality of the coatings no longer meets practical requirements for all fields of use. The coatings of this invention obviate the aforedescribed disadvantages. That is, with the coating compositions of this invention, the processor has available a system whereby the curing step can be conducted, independent of the type of baking hardware available, at high or at low temperatures.

Moreover, since the coating compositions of this invention contain no organic solvents or only a small amount of organic solvents, they are environmentally innocuous, so that the expense of the conventional afterburning step can be reduced or eliminated. Due to this fact and to the good baking stability, the coating compositions of this invention lend themselves especially advantageously to industrial mass production varnishing operations.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are by weight.

EXAMPLES

General Procedures

I. Preparation of the Polyester

A mixture of 248 g of ethylene glycol (4 moles), 76 g of 1,2-propanediol (1mole), 600 g of dimethyl hexahydroterephthalate (3moles), and 194 g of dimethyl terephthalate (1mole), after adding 0.8 ml of a titanium tetraisopropylate solution (10% by volume in isopropanol), is heated for 2–3 hours at 180°–190° C., under agitation and a gentle nitrogen stream, and while constantly removing the thus-formed methanol by distillation. The temperature is then gradually raised at 210° C. After a total of 22 hours, almost 256 g of methanol has been split off. The clear, colorless ester mixture has an acid number of 0.9 mg KOH/g and a hydroxy number of 128 mg KOH/g, corresponding to an average molecular weight of 869. The polyester is used to prepare a solution in ethyl glycol acetate (80% strength).

II. Raising the Acid Number of a Polyester

Under agitation, 1.72 g of trimellitic anhydride is added at 170° C. to 100 g of the solvent-free polyester of (I). The mixture is left for about 1 hour under nitrogen at this temperature. This thus-obtained product has, after cooling, an acid number of 9.7 mg KOH/g. The polyester is subsequently dissolved in ethyl glycol acetate (80% strength).

III. Preparation of a Binder

The polyester of the polyester solution is mixed with a commercially available hexamethylolmelamine derivative or with a solution of a melamine-formaldehyde-alkanol condensate in the desired solids ratio. If the ester and the aminoplast are not compatible with each other, the mixture of the two components, which contains solvent with the use of aminoplast solutions, is heated for 10–60 minutes at 50°–100° C.

IV. Production of a Coating Composition

To produce a coating composition, a pigmenting step is conducted, for example on a three-roll mill, optionally after adding solvents, in the desired binder/pigment ratio by incorporating the corresponding amount of pigment.

V. Production and Testing of the Coatings

For testing purposes, the coating composition is applied at room temperature to test metal sheets and glass panes and then baked. In order to lower the baking temperature, p-toluenesulfonic acid (pTA) or a nonionic, blocked catalyst is added when using the less reactive aminoplasts. The layer thickness of the films on which the testing is conducted is normally about 40 μm. The hardness test takes place in accordance with DIN [German Industrial Standard] 53 157 by determining the pendulum hardness according to König. The elasticity of the coatings is determined by the Erichsen depression test (DIN 53 156). As a measure of the elasticity, the degree of depression of the coated metal sheet at which the coating begins to tear is indicated in millimeters. An essential factor for this testing method is the gradual deformation of the coating (advancement: 0.2 mm/sec.).

Examples denoted by letters represent comparative examples. All data regarding quantitative ratios, time periods, etc., which have not been mentioned in III through V can be derived from the tables.

COMPARATIVE EXAMPLE A (German Pat. No. 2,343,436, Example 8)

A mixture of 62 g of ethylene glycol (1 mole) and 100 g of dimethyl hexahydroterephthalate (0.5 mole), after addition of 1 ml of a 10% volume isopropanol solution of titanium tetraiospropylate is heated for 2–3hours at 180°–190° C., under agitation, a gentle nitrogen stream, and constant removal of the methanol by distillation. The temperature is then gradually increased at 200° C. After a total of 16 hours, about 32 g of methanol has been split-off. After cooling the mixture, 124 g of ethylene glycol (2 moles), 148 g of phthalic anhydride (1 mole), and 73 g of adipic acid (0.5 mole) are added thereto and the mixture is heated according to the following temperature-time plan: 2 hours at 140° C.; 2 hours at 160° C.; 4 hours at 180° C.; 4hours at 190° C. and 3–4hours at 200° C. After splitting-off about 36 g of water, a clear polyester is obtained having a hydroxy number of 237 mg KOH/g and an acid number of 4.7 mg KOH/g, corresponding to an average molecular weight of about 465. From this polyester, a coating composition is produced by adding a commercially available, extensively methyl-etherified hexamethylolmelamine which is liquid at room temperature and titanium dioxide. This coating composition contains 70 parts of polyester, 30 parts of aminoplast, 80 parts of titanium dioxide, 8 parts of a 50% solution of a commercial, nonionically blocked acid catalyst, and 20% by weight of ethyl glycol acetate. The coatings, baked at 120° C./30 min. have the following properties:
[Hardness] H:less than 50 seconds
[Depression] D:greater than 10 millimeters

COMPARATIVE EXAMPLE B (German Pat. No. 2,457,775, Example 8)

(i) In accordance with the method described under "Preparation of the Polyester", a polyester is produced from 3.5 moles of ethylene glycol, 0.5 mole of 1,2-propanediol, and 3 moles of DMHT. This polyester has a hydroxy number of 170 mg KOH/g, corresponding to an average molecular weight of 659. A coating composition is prepared from 75 parts of the polyester, 25 parts of the aminoplast used in Example A, 80 parts of titanium dioxide, 2.5 or 5.0 parts, respectively, of a 20% isopropanolic p-toluenesulfonic acid solution and 43 g of ethyl glycol acetate. The coating composition produces coatings having the following values:

TABLE 1

| Baking Conditions [°C./min.] | Type and Amount of Catalyst (% by Wt. Based on the Binder) | H [sec.] | D [mm.] |
|---|---|---|---|
| 120/30 | 0.5 pTA | 83 | >10 |
| 120/30 | 1.0 pTA | 127 | 9.7 |
| 120/90 | 0.5 pTA | 149 | 9.7 |

(ii) When replacing the 2.5 parts of the p-toluenesulfonic acid solution by 8 parts of the catalyst solution set forth in Example A, the following coating properties result after baking at 120° C./30 min.:
H:less than 50 seconds
D:greater than 10 millimeters (iii) 87.5 g of an 80% solution in ethyl glycol acetate of the polyester according to Example B(i), acidified to an acid number of 9.9 mg KOH/g with trimellitic anhydride, is combined with 33.3 g of a commercial solution of a partially methylated, more highly reactive melamine resin (90% in isopropanol —"RESIMENE" 730). The mixture is then pigmented with 80 g of titanium dioxide and, after adding 24.2 g of ethyl glycol acetate, baked at 120° C./30 min. The resultant properties are:
H:56 seconds
D:greater than 10 millimeters

COMPARATIVE EXAMPLE C (DOS 2,437,217, Example 1)

(i) 519.4 g of phthalic anhydride, 57 g of adipic acid, 160 g of 1,2-propanediol, 159.6 g of ethylene glycol, and 81 g of neopentyl glycol are heated using a gradual temperature increase, within 8 hours to 200°C. and reacted to an acid number of 12.6 mg KOH/g while passing a stream of nitrogen through the mixture and while removing the thus-formed water of reaction continuously. Thereafter, the mixture is dissolved in ethyl glycol acetate (80% strength). The polyester solution is mixed in a solids ratio of 80:20 with hexakis(methoxy)-methylamine and then triturated with 80 parts of titanium dioxide. After adding 1 g of a 20% isopropanolic p-toluenesulfonic acid solution, the mixture is diluted with 24 g of ethyl glycol acetate and, after application as a coating, baked for 30 minutes at 170° C. The resultant coating is hard and brittle, having the following properties:
H:188 seconds
D:1.2 millimeters (ii) The 80% solution of the polyester described in Example C(i) is mixed in a solids ratio of 7:3 with the partially methylated melamine resin described in Example B(iii), and then pigmented with titanium dioxide in a proportion of 1:0.8. The properties of the baked coating are shown in Table 2.

TABLE 2

| Baking Conditions [°C./min.] | H [sec.] | D [mm.] |
|---|---|---|
| 120/30 | 126 | 9.5 |
| 170/30 | 182 | 0.7 |

(iii) A coating composition is prepared from 100 parts of the 80% polyester solution of Example C(i), 20 parts of the melamine resin described in Example A, 80 parts of titanium dioxide, and 1 part of a 20% by weight isopropanolic p-toluenesulfonic acid solution. By adding ethyl glycol acetate, the composition is diluted to a viscosity of 40 seconds (DIN 53 211—4 mm beaker, 20° C.). Subsequently, a sheet-metal panel (70×200 mm) having a thickness of 1 mm is coated with the aid of a doctor blade, so that layer thicknesses of 50±3 μm would result after baking in a horizontal position. The lower portion of the panel (5 cm) remains uncoated. After a venting time of 10 minutes, the panel is baked while suspended in the vertical position. (If the antisag property is inadequate, a layer thickness gradient will evolve. The measuring points are at a distance of 1.5 cm from the upper and lower edges, respectively, of the coating. Runners can be discerned in the uncoated, lower region of the panel if the coating has a great tendency to flow.) The results are shown in Table 3 which also contains properties of the coating of Example 5(a) except that the polyester has been reacted with trimellitic anhydride to an acid number of 9.3.

TABLE 3

| Coating Composition | Baking Conditions [°C./min.] | H [sec.] | D [mm.] | Layer Thickness [μ] at a Distance of 1.5 cm. from upper edge | lower | Runners |
|---|---|---|---|---|---|---|
| Example C(iii) | 120/30 | 141 | 10 | 41 | 59 | Many |
|  | 170/30 | 197 | 1.6 | 43 | 61 | Traces |
| Example 5(a) | 120/30 | 147 | 10 | 48 | 53 | None |
| (*) | 170/30 | 182 | 7.8 | 49 | 50 | None |

(*) Reacted with TMA to an acid number of 9.3.

EXAMPLE D

A polyester having a hydroxy number of 163 mg KOH/g and an acid number of 0.6 mg KOH/g, corresponding to a molecular weight of 685, is produced according to the above-described method I from 3 moles of ethylene glycol, 1 mole of 1,2-propanediol, 1.8 moles of dimethyl hexahydroterephthalate and 1.2 moles of dimethyl terephthalate. The thus-obtained product is partially crystalline at room temperature and cannot be made into a clear solution with varnish solvents, such as, for example, xylene, butyl acetate, n-butanol, ethyl glycol acetate, etc.

EXAMPLES 1–10

All quantitative data refer to weights unless indicated otherwise. The coatings were prepared and tested using General Procedures I–V above. The details and results are contained in Table 4 below.

ABBREVIATIONS

PES:Saturated polyester
EG:Ethylene glycol
PG:1,2-Propanediol
CHDM:1,4-bis(hydroxymethyl)cyclohexane
Gly:Glycerol
DMHT:Dimethyl hexahydroterephthalate
DMT:Dimethyl terephthalate
TMA:Trimellitic anhydride
pTA:p-toluenesulfonic acid
HMM:Extensively methyl-etherified, commercial hexamethylolmelamine ("MAPRENAL" MF 900)
MFC:More highly reactive, partially methyl-etherified, commercial melamineformaldehyde condensation product; 90% strength in isopropanol ("RESIMENE" 730)
bl. cat.:Approximately 50% solution of a non-ioni blocked commercial catalyst acid ("VESTURIT" catalyst BL 1203)
A.N.:Acid number
H:Pendulum hardness (DIN 53 157)
D:Elasticity (DIN 53 156)

TABLE 4

| Example No. | PES from [mol] | Average PES Mol. Wt. | Weight Ratio PES: Aminoplast: TiO₂ | Type of Aminoplast | Type and Amount of Catalyst (Wt. % Based on Binder) | Baking Conditions [°C./min.] | H [sec.] | D [mm.] |
|---|---|---|---|---|---|---|---|---|
| 1 | 1.25 EG<br>1.25 PG<br>1.275 DMHT<br>0.225 DMT | 385 | 7.5:2.5:8<br>" | HMM<br>" | 0.5 pTA<br>" | 120/30<br>170/30 | 173<br>184 | 8.9<br>4.8 |
| 2 | 3 EG<br>1 PG<br>2.5 DMHT<br>0.5 DMT | 710 | 7.5:2.5:0<br>"<br>7.5:2.5:8<br>"<br>7.5:2.5:0<br>" | HMM<br>"<br>"<br>"<br>"<br>" | 0.5 pTA<br>"<br>"<br>"<br>8 bl.cat.<br>" | 120/30<br>140/30<br>120/30<br>140/30<br>120/30<br>140/30 | 224<br>225<br>154<br>162<br>195<br>209 | >10<br>>10<br>9.8<br>8.2<br>>10<br>>10 |
| 3 | 3.2 EG<br>0.8 CHDM<br>2.65 DMHT<br>0.35 DMT<br>(reacted with TMA | 725 | 7:3:8<br>" | MFC<br>" | —<br>— | 120/30<br>160/30 | 121<br>171 | >10<br>7.1 |

TABLE 4-continued

| Example No. | PES from [mol] | Average PES Mol. Wt. | Weight Ratio PES: Aminoplast: TiO₂ | Type of Aminoplast | Type and Amount of Catalyst (Wt. % Based on Binder) | Baking Conditions [°C./min.] | H [sec.] | D [mm.] |
|---|---|---|---|---|---|---|---|---|
|  | to acid number 9.3) |  |  |  |  |  |  |  |
| 4 | 4 EG | 865 | 8:2:0 | HMM | 0.5 pTA | 120/30 | 197 | >10 |
|  | 1 PG |  | " | " | " | 170/30 | 232 | 9.8 |
|  | 3 DMHT |  | 8:2:8 | " | " | 120/30 | 157 | >10 |
|  | 1 DMT |  | " | " | " | 140/30 | 187 | >10 |
| 5a | 4 EG | 965 | 7.5:2.5:8 | HMM | 0.5 pTA | 120/30 | 153 | 9.9 |
|  | 1 CHDM |  |  | " | " | 170/30 | 192 | 8.7 |
|  | 3.5 DMHT |  |  |  |  |  |  |  |
|  | 0.5 DMT |  |  |  |  |  |  |  |
| 5b | (reacted with TMA to acid number 9.3) |  | 7:3:8 | MFC " | — — | 120/30 160/30 | 153 189 | >10 8.8 |
| 6 | 1 EG | 1,020 | 7:2.7:8 | MFC | — | 120/30 | 139 | 9.4 |
|  | 3 PG |  |  | " | — | 160/30 | 170 | 7.3 |
|  | 1 CHDM |  |  |  |  |  |  |  |
|  | 3.5 DMHT |  |  |  |  |  |  |  |
|  | 0.5 DMT |  |  |  |  |  |  |  |
|  | (reacted with TMA to acid number 9.6) |  |  |  |  |  |  |  |
| 7 | 3 EG | 1,190 | 7:2.7:8 | MFC | — | 120/30 | 185 | 9.8 |
|  | 2 CHDM |  |  | " | — | 140/30 | 198 | 8.9 |
|  | 3.5 DMHT |  |  |  |  |  |  |  |
|  | 0.5 DMT |  |  |  |  |  |  |  |
|  | (reacted with TMA to acid number 9.6) |  |  |  |  |  |  |  |
| 8 | 3.5 EG | 1,425 | 7.5:2.5:8 | HMM | 0.5 pTA | 120/30 | 157 | >10 |
|  | 3.5 PG |  | " | " | " | 170/30 | 189 | 8.6 |
|  | 5.05 DMHT |  |  |  |  |  |  |  |
|  | 0.95 DMT |  |  |  |  |  |  |  |
| 9 | 3.2 EG | 715 | 7.5:2.5:8 | HMM | 0.5 pTA | 120/20 | 139 | 9.7 |
|  | 0.5 PG |  | " | " | " | 120/30 | 153 | 9.1 |
|  | 0.3 Gly |  |  |  |  |  |  |  |
|  | 2.5 DMHT |  |  |  |  |  |  |  |
|  | 0.5 DMT |  |  |  |  |  |  |  |
| 10 | 4.0 PG | 1,045 | 7.5:2.5:8 | HMM | 0.5 pTA | 120/30 | 145 | >10 |
|  | 1.0 CHDM |  |  |  |  | 170/30 | 178 | 8.6 |
|  | 3.5 DMHT |  |  |  |  |  |  |  |
|  | 0.5 DMT |  |  |  |  |  |  |  |

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a liquid coating composition comprising a small amount of solvent or no solvent, a binder and optionally conventional auxiliary agents, wherein the binder consists essentially of:
   (A) 45–10% by weight of an aminoplast, the low molecular weight precursors thereof, or mixtures thereof; and
   (B) 55–90% by weight of an at least difunctional polyester or a mixture of such polyesters; wherein the polyester component B has been produced by the condensation of an alcohol component I with an acid component III, wherein component I consists essentially of:
   I.1 0–50 molar percent of one or aliphatic polyols of 3 or 4 hydroxy groups and 3–6 carbon atoms; and
   I.2 100–50 molar percent of a mixture II of aliphatic and cycloaliphatic diols wherein mixture II consists essentially of:
   II.1 0–90 molar percent of ethylene glycol;
   II.2 0–90 molar percent of 1,2-propanediol; and
   II.3 0–40 molar percent of one or more aliphatic or cycloaliphatic diols whose hydroxy functions are separated by 2–8 carbon atoms and up to 2 carbon atoms of which can be replaced by oxygen atoms which are separated from each other and from the hydroxy groups by at least 2 carbon atoms; wherein component III consists essentially of a mixture of:
   III.1 67–92 molar percent of hexahydroterephthalic acid or a lower alkyl ester thereof; and III.2 8-33 molar percent of an aromatic dicarboxylic acid or a lower alkyl ester derivative thereof;

wherein the polyester component B has a molecular weight of 300-1,500 and wherein the binder may be obtained by the cocondensation of aminoplast component A with polyester component B, or by the cocondensation of the starting materials used for the production of aminoplast component A with polyester component B;

the improvement wherein component III.2 is terephthalic acid or a lower alkyl ester derivative thereof.

2. A coating composition of claim 1, wherein the mixture II consists essentially of:
60-90 molar percent of the component II.1;
10-40 molar percent of the component II.3; and
0 molar percent of the component II.2.

3. A coating composition of claim 1 wherein the mixture II consists essentially of 60-90 molar percent of the component II.2; and 10-40 molar percent of the component II.3; and 0 molar percent of the component II.1.

4. A coating composition of claim 1 wherein the mixture II consists essentially of: 10-90 molar percent of the component II.1; 90-10 molar percent of the component II.2; and 0-40 molar percent of the component II.3.

5. A coating composition of claim 1, wherein the polyester component B contains, as component III.2, 12-25 molar percent of terephthalic acid units.

6. A coating composition of claim 1, wherein said molar percentages are as follows: component A: 35-15%; component B: 65-85% component I.1: 0-20%; component I.2: 100-80%; component II.1: 20-80% component II.2: 80-20%; component II.3: 0-30%; component III.1: 75-88%; and component III.2: 12-25%.

7. A coating composition of claim 1, wherein the acid components III.1 and III.2 are used as the lower alkyl esters thereof.

8. A coating of claim 7, wherein the esters are the dimethyl esters.

9. A coating composition of claim 1, wherein the molecular weight of component B is 600-1,000.

10. The coating composition of claim 1, wherein component A is a hexamethylolmelamine derivative which is liquid at room temperature and is etherified with alcohols of 1-4 carbon atoms.

11. The coating composition of claim 1 which is solvent-free.

12. The coating composition of claim 1 which contains up to 30 wt. % of solvent.

13. A coated substrate whose coating has been applied by baking thereon a coating composition of claim 1.

14. The coating composition of claim 1, wherein the polyester carries predominantly free hydroxy end groups.

15. A method of providing a substrate with a protective coating comprising coating the substrate with a coating composition of claim 1 and baking the coated substrate at a temperature of 100°-250° C.

* * * * *